United States Patent Office 3,040,713
Patented June 26, 1962

3,040,713
BOOSTER MOTOR MECHANISM
William Stelzer, Bloomfield Hills, Mich., assignor to Kelsey-Hayes Company, Detroit, Mich., a corporation of Delaware
Filed Oct. 19, 1960, Ser. No. 63,598
15 Claims. (Cl. 121—41)

This invention relates to a booster motor mechanism, particularly for use in motor vehicle power brake systems, and is an improvement over the structure shown in the patent to David T. Ayers, Jr., No. 2,953,120, granted September 20, 1960.

In the patent referred to there is disclosed a booster motor mechanism, particularly adapted to be operated by super-atmospheric pressure, and wherein initial movement of the valve mechanism of the motor by the vehicle brake pedal takes place against relatively light resistance, followed by the operation of means for increasingly reacting against the vehicle brake pedal as motor differential pressures increase incident to resistance to operation of the master cylinder piston. A first or light stage of reaction is provided in the motor mechanism of the patent by exposing to motor pressures a pressure responsive member connected to the element which operates the valve mechanism. A diaphragm is connected to the member which operates the valve mechanism and its movement to transmit reaction forces to the brake pedal is opposed by a counter-reaction spring which delays the occurrence of the second stage of reaction until approximately the point at which the vehicle brake shoes engage the drum.

An important object of the invention is to provide a fluid pressure operated motor mechanism having means for providing changing reaction against operation of the control valve mechanism with stronger reaction occurring after the motor mechanism has been energized to a predetermined extent, and to accomplish such result without the use of a counter-reaction spring generally employed in two-stage reaction devices for motors of this general type.

A further object is to improve the prior construction referred to by eliminating the counter-reaction spring and employing a single pressure responsive member which offers little or no resistance to movement of the brake pedal upon initial operation thereof but which is so constructed as to afford substantial resistance to movement of the brake pedal only after motor pressures have increased to a substantial extent during later stages of brake operation.

A further object is to provide a motor mechanism, the valve operating member of which is provided with a pressure surface exposed to pressures admitted to the motor, and to connect the valve operating or manually operable member to the motor piston by a pressure diaphragm, portions of which are thin and relatively highly flexible to permit free initial valve operation, and portions of which are relatively stiff to oppose the effectiveness of the relatively thin portion of the diaphragm in transmitting reaction forces to the brake pedal until higher differential motor pressures occur.

A further object is to provide a such a mechanism wherein the manually operable valve operating element has a surface engageable by the relatively thin portion of the diaphragm and to prevent such engagement until motor pressures increase to a predetermined extent by connecting the relatively thin diaphragm portion to a relatively thick integral portion which opposes movement of the thin diaphragm portion into engagement with the manually operable member until motor pressures increase to a predetermined point incident to resistance to movement of the master cylinder piston of the brake system when the brake shoes initially engage the drums.

A further object is to provide such a mechanism wherein the relatively thin diaphragm portion forms the radially inner area thereof and wherein the thicker stiffer diaphragm portion forms the radially outer portion of the diaphragm and is integral with the inner thin portion whereby pressures acting against the latter diaphragm portion exert a pull against the thicker portion and must overcome the relative stiffness thereof before the inner portion of the diaphragm can engage the manually operable member to oppose movement thereof.

A further object is to provide a device of this character wherein the diaphragm may be so formed that the relatively thick portion thereof must be deformed from its natural shape when clamped in position, thus having the effect of pre-loading the relatively thick diaphragm portion to increase the pressure necessary for moving the inner diaphragm portion into engagement with the manually operable member.

Other objects and advantages of the invention will become apparent during the course of the following description.

In the drawings I have shown two embodiments of the invention. In this showing:

FIGURE 3 is an enlarged axial sectional view through a modified form of reaction diaphragm.

Figure 1:
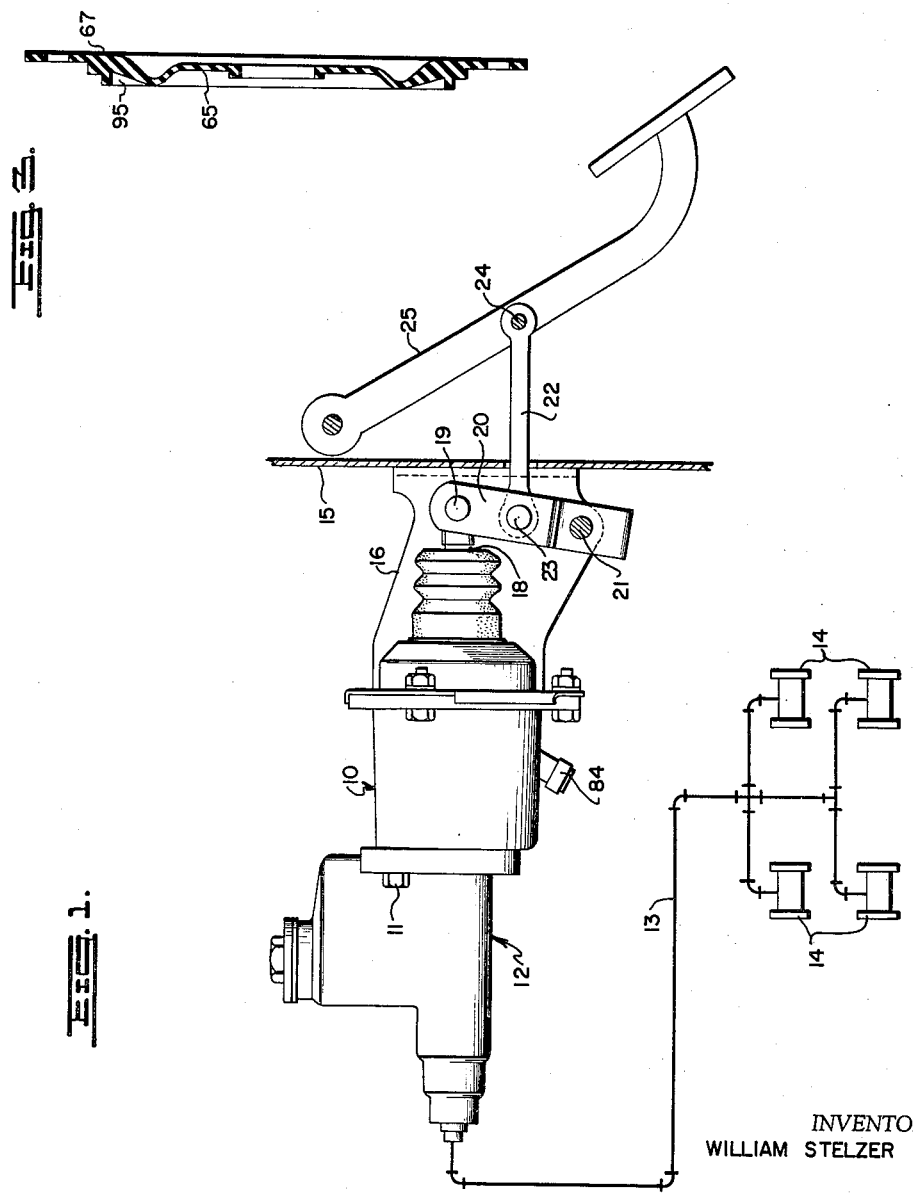
FIGURE 1 is a side elevation of the motor mechanism forming a part of the vehicle brake system, portions of the latter being diagrammatically illustrated.

Referring to FIGURE 1, the numeral 10 designates the booster motor as a whole clamped as at 11 to a master cylinder 12 from which fluid is displaced, in a manner to be described, through brake lines 13 to the vehicle wheel cylinders 14. The motor is fixed to the vehicle fire wall 15 by a bracket 16.

A valve mechanism to be described controls operation of the motor and is operated by a rod 18 pivoted as at 19 to a lever device 20, pivotally supported as at 21 to the bracket 16. A push rod 22 is pivotally connected at one end as at 23 to the lever device 20 intermediate its ends, and the other end of the rod 22 is pivoted as at 24 to a conventional depending pedal lever 25.

Figure 2:
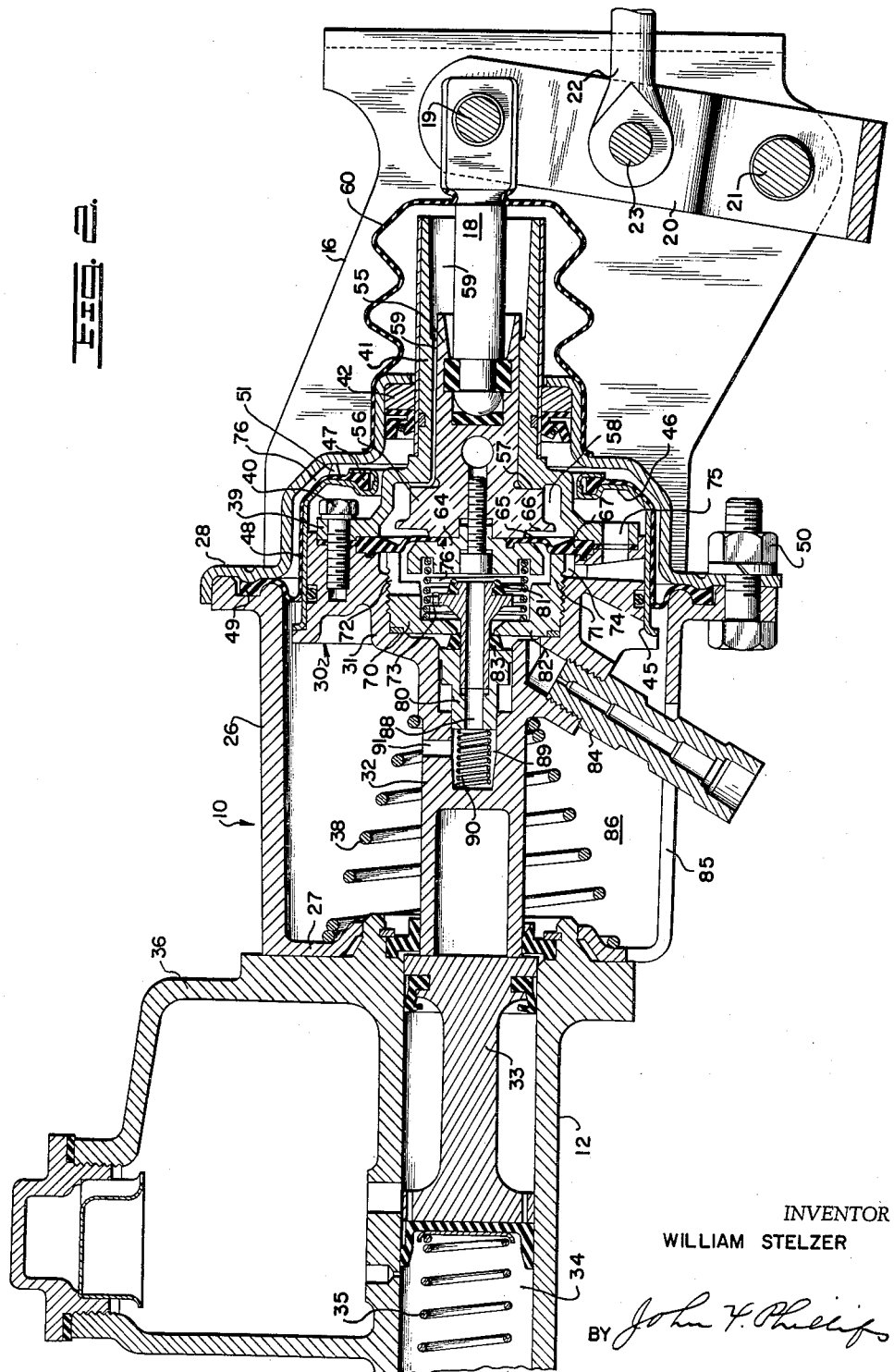
FIGURE 2 is an enlarged axial sectional view through the motor and associated elements, the parts being shown in normal off positions.

The motor 10 is shown in detail in FIGURE 2. This motor comprises a cylindrical casing 26 having a head 27 at one end bearing against the master cylinder 12. The other end of the casing 26 is provided with a head 28 further described below.

The motor is provided with a pressure responsive unit indicated as a whole by the numeral 30 and comprising a body casting 31 having an axial extension 32 engaging a master cylinder plunger 33 to effect movement thereof to displace fluid from the usual pressure chamber 34 formed in the master cylinder 12. The plunger 33 is provided with the usual return spring 35 and is supplied with hydraulic fluid in the usual manner from a conventional reservoir 36.

The pressure responsive unit 30 is biased to its normal off position by a spring 38. The unit 30 further comprises a cap member 39 secured to the body 31 as at 40 and provided with an axially extending tubular portion 41 slidable in a bearing and sealing unit 42 carried by the cap member 28. A shell 45 has a cylindrical portion tightly fitted around the body 31 and is provided with a radially inwardly extending portion 46 to which is clamped a bead 47 formed on the inner periphery of a rolling diaphragm 48. The outer periphery of such diaphragm is formed with a bead 49 arranged between the casing 26 and cap member 28, these members being secured together in clamping sealing engagement with the bead 49.

by bolts 50. It will become apparent that when the unit 30 is operated, the diaphragm 48 rolls over the cylindrical portion of the shell 45. The diaphragm 48, formed of rubber or other resilient material, is provided with bumpers 51 to limit movement of the pressure responsive unit to off position under the influence of the spring 38, and to silence such movement.

A manually operable member 55 is slidable in the tubular cap portion 41 and is provided with an annular enlargement 56 engaging a shoulder 57 to limit movement of the member 55 to its normal off position shown in FIGURE 1. The member 55 is suitably flexibly connected to the rod 18 to be actuated thereby. The enlargement 56 is arranged in a chamber 58 formed in the cap member 28 and the tubular portion 41 is internally grooved as at 59 to connect the chamber 58 to the space 59 within the projecting end of the tubular member 41. The cap member 28 is connected to the rod 18 by a conventional boot 60 which may have a bleed opening or pin hole therein so that the space 59 communicates with the atmosphere. Thus the chamber 58 is always at atmospheric pressure.

A head 64 is fixed to the manually operable member 55 and clamps in position with respect thereto the radially inner portion of a diaphragm 65, such portion of the diaphragm being thin and highly flexible. Radially outwardly of the surface of the enlargement 56 which secures the diaphragm 65 to the head 64, such enlargement is provided with a surface 66 spaced from but engageable in a manner to be described with the radially inner thin portion of the diaphragm 65. Such thin portion of the diaphragm is preferably molded integrally with a relatively thicker stiffer outer diaphragm portion 67 clamped between the body 31 and cap 39.

A nut 70 is threaded into the body 31 and is provided at its right-hand end in FIGURE 2 with an annular flange 71 broken only by a radial groove 72. This groove affords communication between chamber 73 within the nut 70 and an outer annular chamber 74 communicating as at 75 with the variable pressure or working chamber 76 of the motor, formed within the cap member 28. It will be noted that the left-hand face of the thick flange portion 67 in FIGURE 2 normally seats against the adjacent end of the flange 71. Within the chamber 73 is arranged a return spring 76 for maintaining the head 64 and manually operable member 55 in their normal positions.

A preferably two-part valve body 80 is slidable in the body member 31 and is provided within the chamber 73 with a resilient valve element 81 engageable against the head 64 but normally disengaged therefrom. The nut 70 is provided with a radial wall 82 forming a seat engageable by a resilient valve element 83 carried by the valve body 80. This valve normally cuts off communication between the chamber 73 and a fitting 84 connected to a suitable source of super-atmospheric pressure (not shown). This fitting moves longitudinally in a slot 85 formed in the motor casing 26, the chamber 86 within such casing thus being open to the atmosphere. The valve body 80 is provided with an axial passage 88 therethrough, one end of which communicates with the chamber 73 and the other end of which communicates with a chamber 89 within the axial extension 32, a spring 90 being arranged in such chamber and biasing the valve body 80 to the right in FIGURE 2 to maintain the valve 83 normally closed. The chamber 89 communicates with the chamber 86 through a port 91, and accordingly it will be apparent that atmospheric pressure is always present in the passage 88.

In the form of the invention shown in FIGURE 2, the diaphragm 65 is molded in the shape shown so that it naturally fits directly against adjacent parts of the body 31 and member 39 between which it is clamped, and against the end of the flange 71. In the form of the invention shown in FIGURE 3, the diaphragm is so molded that the left-hand face of the thicker portion 67 slopes to the left as at 95. Accordingly, when the diaphragm is clamped into position the adjacent portion of the thicker part of the diaphragm must be flexed to the right in order to be clamped between the members 31 and 39 and to engage against the end of the flange 71. This distortion of the thicker portion of the diaphragm increases its stiffness and in effect pre-loads it and thus increases the pressure necessary to move the thin diaphragm portion 65 into engagement with the surface 66, as described below.

*Operation*

Except for the reaction means, the motor operation is substantially identical with that described in the prior Patent No. 2,953,120, referred to above. Normally the valve 81 is open, thus connecting the atmospheric passage 88 through the radial groove 72 with the annular chamber 74, which is always in communication with the working chamber 76 of the motor through passages 75. The valve 83 is closed, thus disconnecting the pressure source from the chamber 73, and accordingly atmospheric pressure will be present in this chamber to balance the atmospheric pressure in the chamber 58.

Operation of the pedal 25 (FIGURE 1) moves the rod 22 to swing the lever 20 and thus effect movement of the rod 18 to the left in FIGURE 2 to move the member 55. Such initial movement of the member 55 and the head 64 fixed thereto takes place relatively easily due to the high degree of flexibility of the inner diaphragm portion 65, the only resistance to such movement being provided by the relatively light spring 76. Initial movement thus transmitted to the head 64 causes such member to engage and close the valve 81 to disconnect the chamber 73 from the atmosphere. Slight further movement of the head 64, exerting pressure against the valve 81, moves the valve body 80 against the light spring 90 to "crack" the valve 83 and thus admit super-atmospheric pressure to the chamber 73. This pressure flows through the radial groove 72 into the chamber 74 and thus through passages 75 to the working chamber 76 of the motor. Thus higher pressure will be established to the right of the pressure responsive unit 30 to move this unit to the left, and engagement of the axial extension 32 with the piston 33 moves the latter to displace fluid in the usual manner from the chamber 34 through the brake lines 13 to the wheel cylinders 14. This movement takes place solely against resistance to movement of the usual residual pressure valve, the brake shoes during initial operation being moved relatively freely toward the brake drums.

The pressure admitted to the chamber 76 obviously will be duplicated in the chamber 73, and such pressure acts against the left-hand face of the diaphragm 65 in FIGURE 2 to tend to move the radially inner portion of the diaphragm toward the right. In early stages of motor operation, relatively low pressures in the motor chamber 76 are sufficient to move the unit 30 since little resistance to movement of the master cylinder plunger 33 is encountered. Due to the stiffness of the diaphragm portion 67, movement of the thin inner portion of the diaphragm 65 to the right is resisted and accordingly such portion of the diaphragm does not engage the face 66. During such initial motor operation, pressure in the chamber 73 will act against the left-hand face of the nut 64 to provide an initial stage of pedal reaction proportional to pressure in the chamber 73 and hence proportional to pressure in the motor chamber 76.

During this stage of operation the thicker diaphragm portion 67 remains in engagement with the adjacent end of the flange 71. When the brake shoes engage the drums, the piston 33 immediately generates higher pressure in the master cylinder chamber 34, thus resisting movement of the pressure responsive unit 30 of the motor. At this point, substantially increased pressures will occur in the motor chamber 76 to overcome resistance to movement of the master cylinder plunger 33, and of course there will be a corresponding rapid increase in pressure in the chamber 73. This increase in pressure overcomes the stiffness of the diaphragm portion 67 to cause it to be deflected to the right in FIGURE 2 and the radially inner portion of the diaphragm 65 will engage the surface 66, and the effective pressure area of the left-hand face of the diaphragm 65, exposed to pressure in the chamber 73, will increase resistance to movement of the manually operable member 55, thus providing a higher degree of reaction which will be proportional to motor energization but substantially greater than in initial stages of motor operation.

In the prior patent referred to, a diaphragm similar to the diaphragm 65 is thin throughout its area and a counteraction spring is arranged between the right-hand side of the diaphragm and the shoulder portion 57 of the member 39 to delay the transmission of a second stage of reaction to the brake pedal, it being necessary for motor pressures to increase to the point at which the loading of the counter-reaction spring is overcome. The use of the counter-reaction spring is eliminated in the present construction, together with the metal ferrule required as a spring seat against the reaction diaphragm. The present construction thus provides a single reaction element, namely a diaphragm, whereas three parts were required in the prior construction. The present construction therefore represents an important simplification over the prior construction and has been found to provide an extremely smooth transition between the first and later stages of reaction. Whereas in the earlier construction, the reaction spring would be rather suddenly overcome at given motor pressures, the more gradual action of the present diaphragm smooths out the transition between the first and later stages of reaction, thus presenting such later stages from occurring relatively suddenly. The present construction is thus an improvement over the prior construction as to both structure and operation.

When pressure in the chamber 73 overcomes the stiffness of the outer diaphragm portion, the inner thinner diaphragm portion engages the surface 66 which absorbs the pressure to be delivered to the brake pedal as reaction force. Thus the thin diaphragm portion is protected against rupturing. Without the surface 66 the device is fully operative since pressure against the radially inner diaphragm portion would be transmitted through the inner periphery of the diaphragm to the manually operable member 55 to transmit reaction force thereto. The use of the surface 66 is obviously preferred, however, since it provides a pressure bearing surface for the thin portion of the diaphragm.

The form of the invention shown in FIGURE 3 may be employed and the molding of the reaction diaphragm as shown requires the flexing of the thicker diaphragm portion when installed between the body 31 and member 39, thus serving in effect to pre-load the thicker diaphragm portion so that the normal resistance to movement of the thin diaphragm portion into engagement with the surface 66 is increased. The form of the invention shown in FIGURE 3 is preferably employed when the pressure in the source is relatively high. Both forms of diaphragm may be fabric reinforced, and this is preferred where the air pressure is substantial, and in any event it is preferred that the radially outer portion of the diaphragm 65 be so reinforced to prevent any extrusion of the rubber of the diaphragm upon the tightening of the screws 40.

The returning of the parts to normal position will be rather obvious. Upon the releasing of the brake pedal, the spring 76 returns the head 64 to normal position to open the valve 81 and the spring 90 closes the valve 83 to cut off the supply of fluid pressure to the motor. The motor chamber 76 will again be open to the atmosphere through the axial passage 88, whereupon the spring 38 returns the pressure responsive unit 30 to its normal off position.

It will be apparent that the use of the novel type of reaction means in the present case simplifies installation as well as reducing the cost of manufacture by the elimination of two parts. It also will be apparent that the operation of the motor and the provision of the means for smoothing out the transition to later stages of pedal reaction are highly efficient and dependable.

It is to be understood that the forms of the invention shown and described are to be taken as preferred examples of the same and that various changes in the shape, size and arrangement of the parts may be made as do not depart from the spirit of the invention or the scope of the appended claims.

I claim:

1. A fluid pressure booster motor mechanism comprising a casing, a pressure responsive unit therein provided at one side thereof with a variable pressure chamber, a valve mechanism carried by said pressure responsive unit and normally balancing pressures on opposite sides of said pressure responsive unit and operable for connecting said variable pressure chamber to a source of higher pressure, a control chamber subject to the same pressure as said variable pressure chamber, and a pressure responsive element exposed to pressure in said control chamber and engageable with said valve mechanism to oppose valve operating movement thereof, said pressure responsive element having a portion opposing such engagement of said element with said valve mechanism to delay the transmission of valve operating resistance to said valve mechanism until pressure in said control chamber rises to a predetermined extent.

2. A fluid pressure booster motor mechanism comprising a casing, a pressure responsive unit therein provided at one side thereof with a variable pressure chamber, a valve mechanism carried by said pressure responsive unit and normally balancing pressures on opposite sides of said pressure responsive unit and operable for connecting said variable pressure chamber to a source of higher pressure, a control chamber subject to the same pressure as said variable pressure chamber, and a pressure responsive reaction element in the form of a diaphragm having a relatively thin highly flexible portion engageable with said valve mechanism under the influence of pressure in said control chamber to oppose operation of said valve mechanism, said diaphragm having a stiffer portion connected to said relatively thin portion to oppose movement of the latter into engagement with said valve mechanism until pressure in said control chamber rises to a predetermined point.

3. A fluid pressure booster motor mechanism comprising a casing, a pressure responsive unit therein provided at one side thereof with a variable pressure chamber, a valve mechanism carried by said pressure responsive unit and normally balancing pressures on opposite sides of said pressure responsive unit and operable for connecting said variable pressure chamber to a source of higher pressure, a control chamber subject to the same pressure as said variable pressure chamber, a manually operable member connected to said valve mechanism and forming therewith a manually movable structure, and a pressure responsive reaction element connected to said manually movable structure and to said pressure responsive unit and exposed to pressure in said control chamber to oppose valve operating movement of said manually movable structure, said pressure responsive element having a portion resisting transmission of force from said pressure responsive element to said manually movable structure whereby such force transmission takes place to oppose valve operating movement of said manually movable structure only after pressure in said control chamber rises to a predetermined point.

4. A fluid pressure booster motor mechanism comprising a casing, a pressure responsive unit therein provided at one side thereof with a variable pressure chamber, a valve mechanism carried by said pressure responsive unit and normally balancing pressures on opposite sides of said pressure responsive unit and operable for connecting said variable pressure chamber to a source of higher pressure, a control chamber subject to the same pressure as said variable pressure chamber, a manually operable member connected to said valve mechanism and forming therewith a manually movable structure, and a reaction diaphragm sealed at its inner periphery to said manually movable structure and at its outer periphery to said pressure responsive unit and exposed to pressure in said control chamber, said diaphragm having a highly flexible portion adjacent said inner periphery subject to increased pressures in said control chamber for transmitting force to said manually movable structure to oppose valve operating movement thereof, said diaphragm having a relatively stiff portion opposing such transmission of force to said manually movable structure until pressure in said control chamber rises to a predetermined point.

5. A fluid pressure booster motor mechanism comprising a casing, a pressure responsive unit therein provided at one side thereof with a variable pressure chamber, a valve mechanism carried by said pressure responsive unit and normally balancing pressures on opposite sides of said pressure responsive unit and operable for connecting said variable pressure chamber to a source of higher pressure, a control chamber subject to the same pressure as said variable pressure chamber, said valve mechanism comprising a manually operable member movable to operate said valve mechanism, and a reaction diaphragm sealed at its inner periphery to said manually operable member and at its outer periphery to said pressure responsive unit, said diaphragm having a relatively thin highly flexible radially inner portion subject to pressure in said control chamber to transmit reaction force to and thus oppose valve operating movement of said manually operable member, said diaphragm having a relatively thick radially outer portion of substantial stiffness operating to oppose and thus delay transmission of reaction force to said manually operable member until pressure in said control chamber increases to a predetermined point.

6. A fluid pressure motor mechanism comprising a casing, a pressure responsive unit having at one side thereof a variable pressure chamber and provided therewithin with a control chamber communicating with said variable pressure chamber, a valve mechanism normally balancing pressures on opposite sides of said pressure responsive unit and operable for connecting said control chamber to a source of higher pressure, a manually operable member movable for operating said valve mechanism and provided with a pressure surface exposed to said control chamber whereby a rise in pressure in such chamber opposes movement of said manually operable member, and a reaction element exposed to pressure in said control chamber and having a relatively highly flexible portion subject to pressures in said control chamber to transmit reaction force to and thus oppose valve operating movement of said manually operable member, said pressure responsive element having a portion of substantially reduced flexibility to oppose and thus delay transmission of reaction forces to said manually operable member until pressure in said control chamber increases to a predetermined point.

7. A fluid pressure motor mechanism comprising a casing, a pressure responsive unit having at one side thereof a variable pressure chamber and provided therewithin with a control chamber communicating with said variable pressure chamber, a valve mechanism normally balancing pressures on opposite sides of said pressure responsive unit and operable for connecting said control chamber to a source of higher pressure, a manually operable member movable for operating said valve mechanism and provided with a pressure surface exposed to said control chamber whereby a rise in pressure in such chamber opposes movement of said manually operable member, said valve mechanism and said manually operable member comprising a movable structure, and a pressure responsive reaction element having one side exposed to pressure in said control chamber and connected at its inner and outer peripheries respectively to said movable structure and to said pressure responsive unit, said pressure responsive element having a relatively thin highly flexible portion adjacent said movable structure engageable with a surface of said movable structure under the influence of pressure in said control chamber, said pressure responsive element having a second portion of substantial thickness to oppose engagement of said relatively thin portion with said surface of said movable structure to delay such engagement until pressure in said control chamber rises to a predetermined point.

8. A mechanism according to claim 7 wherein said pressure responsive element comprises a deformable annular diaphragm having a radially inner portion which is substantially thin and highly flexible and a radially outer annular portion of substantial thickness and stiffness secured to said pressure responsive unit to oppose engagement of said radially inner diaphragm portion with said surface of said manually operable member.

9. A fluid pressure booster motor mechanism comprising a casing, a pressure responsive unit therein provided at one side thereof with a variable pressure chamber, an axial valve mechanism carried by said pressure responsive unit and normally balancing pressures on opposite sides thereof, said valve mechanism being axially movable for connecting said variable pressure chamber to a source of higher pressure, a control chamber subject to the same pressure as said variable pressure chamber, a manually operable member axially movable to operate said valve mechanism and provided with an end formed as a pressure surface exposed to said control chamber whereby when said valve mechanism is initially operated to admit pressure to said variable pressure chamber, pressure against said surface will react against said manually operable member, and a single pressure responsive reaction element exposed to pressure in said control chamber, said reaction element being sealed at its inner periphery to said manually operable member and at its outer periphery to said pressure resonsive unit, the radially inner portion of said reaction element being highly flexible to tend to respond to increased pressures in said control chamber to oppose movement of said manually operable member, said reaction element having relatively stiffer portions tending to prevent response of said flexible portion of said reaction element to pressures in said control chamber whereby such response is delayed until pressure in said control chamber increases to a predetermined point.

10. A mechanism according to claim 9 wherein said reaction element comprises an annular diaphragm formed of flexible material and having a relatively thin radially inner annular portion which tends to respond to increased pressures in said control chamber, the radially outer portion of said diaphragm being annular and relatively thick and of substantially reduced flexibility to oppose movement of said inner diaphragm portion to delay the transmission of reaction forces from said diaphragm to said manually operable member until pressure in said control chamber increases to a predetermined point.

11. A mechanism according to claim 9 wherein said reaction element comprises an annular diaphragm formed of flexible material and having a relatively thin radially inner annular portion which tends to respond to increased pressures in said control chamber, the radially outer portion of said diaphragm being annular and relatively thick and of substantially reduced flexibility to oppose movement of said inner diaphragm portion to delay the transmission of reaction forces from said diaphragm to said manually operable member until pressure in said control chamber increases to a predetermined point, said manually operable member having a surface normally spaced from said radially inner portion of said diaphragm and into engagement with which surface said radially inner portion of said diaphragm is adapted to seat under pressure when pressure in said control chamber increases to said predetermined point.

12. A fluid pressure booster motor mechanism comprising a casing, a pressure responsive unit therein provided at one side thereof with a variable pressure chamber, an axial valve mechanism carried by said pressure responsive unit and normally balancing pressures on opposite sides thereof, said valve mechanism being axially movable for connecting said variable pressure chamber to a source of higher pressure, a control chamber subject to the same pressure as said variable pressure chamber, a manually operable member axially movable to operate said valve mechanism and provided with an end formed as a pressure surface exposed to said control chamber whereby when said valve mechanism is initially operated to admit pressure to said variable pressure chamber, pressure against said surface will react against said manually operable member, and an annular reaction diaphragm sealed at its inner periphery to said manually operable member and at its outer periphery to said pressure responsive unit and having one face exposed to said control chamber, the radially inner portion of said element being thin and highly flexible and the radially outer portion being relatively stiff to delay response of said relatively thin portion to pressures in said control chamber to thus delay the transmission of reaction forces to said manually operable member until pressures in said control chamber increase to a predetermined point, said pressure responsive unit having faces against which said relatively stiff diaphragm portions seat, said diaphragm being pre-formed with portions of said face thereof at an angle to said faces of said pressure responsive unit whereby said relatively thick diaphragm portions are deformed and thus pre-loaded when assembled in engagement with said faces of said pressure responsive unit.

13. A mechanism according to claim 12 wherein said manually operable member is provided with an annular face normally spaced from said relatively thin diaphragm portion and into engagement with which face said relatively thin diaphragm portion is movable when pressure in said control chamber increases to said predetermined point.

14. In a fluid pressure motor wherein a pressure responsive unit is movable by differential pressures established by movement of a valve mechanism from a normal position and wherein movement of such valve mechanism, when the motor is energized, is opposed by a reaction device subject to motor pressures when the valve mechanism is operated, the improvement which comprises forming the reaction device is a diaphragm of flexible material having a thin radially inner portion which tends to be responsive to the same pressure as the motor to oppose movement of the valve mechanism and a relatively thick radially outer portion which is capable of being flexed at higher motor pressures than said relatively thin portion to delay the response of the latter to motor pressures until such pressures increase to the point where said thick diaphragm portion is capable of being flexed, thus delaying the transmission of reaction to said valve mechanism.

15. The mechanism defined in claim 14 wherein said relatively thick diaphragm portion is held in position in the pressure responsive unit flexed from its normal released shape to pre-load it against response to motor pressures.

References Cited in the file of this patent
UNITED STATES PATENTS

| | | |
|---|---|---|
| 2,690,740 | Hupp | Oct. 5, 1954 |
| 2,745,383 | Hupp | May 15, 1956 |
| 2,953,120 | Ayers | Sept. 20, 1960 |